United States Patent
Kobayashi et al.

(10) Patent No.: US 6,601,842 B2
(45) Date of Patent: Aug. 5, 2003

(54) SHEET TRANSFER APPARATUS AND IMAGE READING APPARATUS

(75) Inventors: Atsumi Kobayashi, Yamanashi-ken (JP); Kunihide Suzuki, Kofu (JP); Yutaka Tanaka, Yamanashi-ken (JP); Akiharu Higaki, Yamanashi (JP); Akihiko Tsukui, Yamanashi-ken (JP); Mizuho Shirakura, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/136,435

(22) Filed: May 2, 2002

(65) Prior Publication Data
US 2002/0180137 A1 Dec. 5, 2002

(30) Foreign Application Priority Data
Jun. 1, 2001 (JP) ........................................ 2001-167045

(51) Int. Cl.⁷ ................................................ B65H 5/22
(52) U.S. Cl. ..................... 271/3.14; 271/3.19; 271/4.01; 271/4.05; 271/4.08; 271/10.01; 271/10.06; 271/10.09
(58) Field of Search ............................... 271/3.14, 3.19, 271/4.01, 4.05, 4.08, 10.01, 10.06, 10.09; 399/124

(56) References Cited

U.S. PATENT DOCUMENTS

| | | | | |
|---|---|---|---|---|
| 3,493,299 A | * | 2/1970 | Hazelton | 399/124 |
| 5,339,139 A | * | 8/1994 | Fullerton et al. | 399/203 |
| 5,363,184 A | * | 11/1994 | Matsuo et al. | 399/367 |
| 5,534,989 A | * | 7/1996 | Rubscha et al. | 399/381 |
| 5,731,885 A | * | 3/1998 | Nagahara | 358/496 |
| 5,832,356 A | * | 11/1998 | Kurando et al. | 399/367 |
| 5,940,659 A | * | 8/1999 | Rieck | 399/124 |
| 5,966,569 A | * | 10/1999 | Haneda | 399/121 |
| 5,974,290 A | * | 10/1999 | Inoue | 399/124 |
| 6,075,958 A | * | 6/2000 | Gotoh et al. | 399/124 |
| 6,125,251 A | * | 9/2000 | Shiraishi et al. | 399/124 |
| 6,145,828 A | * | 11/2000 | Arai | 271/3.03 |
| 6,215,970 B1 | * | 4/2001 | Yoshikawa et al. | 399/124 |

OTHER PUBLICATIONS

Patent Abstract of Japan, No. 09–292742, publication date Nov. 11, 1997, Applicant Ricoh Co., Ltd.
Patent Abstract of Japan, No. 05–307294, publication date Nov. 19, 1993, Applicant Fuji Xerox Co., Ltd.

* cited by examiner

*Primary Examiner*—Donald P. Walsh
*Assistant Examiner*—Matthew J Kohner
(74) *Attorney, Agent, or Firm*—Kanesaka & Takeuchi

(57) ABSTRACT

A sheet transfer apparatus for an image reading apparatus includes a sheet supply tray for storing a sheet; a sheet supply device for drawing out the sheet on the sheet supply tray; a transfer device for receiving the sheet from the sheet supply means and placing the sheet at a predetermined position on a platen of an image reading apparatus for reading the image thereon; a discharge device for discharging the sheet on the platen after reading the image thereon; and a discharge tray for receiving the sheet discharged by the discharge device. A switchback device is disposed above the platen for reversing the sheet when necessary, and includes a switchback path for receiving the sheet to reverse the same. The switchback path includes a first opening portion for opening a first area near an inlet side, and a second opening portion for opening a second area away from the inlet side of the switchback path. The switchback path is easily accessible when the sheet is jammed.

14 Claims, 13 Drawing Sheets

SHEET TRANSFER APPARATUS AND IMAGE READING APPARATUS

BACKGROUND OF THE INVENTION AND RELATED ART STATEMENT

This invention relates to a sheet transfer apparatus for an image reading apparatus, which is used with an image forming apparatus such as a copier, facsimile, printer and scanner. The sheet transfer apparatus continuously draws or receives a series of sheets on a sheet supply tray, and aligns and stacks the sheets after images thereupon have been read.

Conventionally, a set of the sheets placed on the sheet supply tray is read sequentially, and is discharged to a discharge tray. When the sheets stacked on the discharge tray, or the sheets after being read on both sides, are required to be reorganized into their original order, a switchback path disposed in the sheet transfer apparatus reverses the sheet from front to back thereof.

Examples of the sheet transfer apparatus having such a switchback path are disclosed in Japanese Patent Publication (KOKAI) No. 09-292742 and Japanese Patent Publication (KOKAI) No. 05-30724.

An automatic document feeder apparatus disclosed in Japanese Patent Publication No. 09-292742 sequentially draws the sheets stacked on the sheet supply tray, transfers the sheets to a platen glass by a transfer belt, and sets the sheets on the platen glass to read images on the sheets. The apparatus is structured to reverse and transfer the sheets via the switchback path to organize the page order of the sheets. The switchback path is formed between the transfer belt and the discharge tray.

The sheet transfer apparatus disclosed in Japanese Patent Publication No. 05-30724 is structured to arrange the switchback path below the sheet supply tray. Vertical positions of the sheet supply tray and discharge tray are reversed from those in Japanese Patent Publication No. 09-292742.

However, in the switchback path for reversing the sheet from a front side to a back side, paper jam occurs easily, because the sheet is forced to bend and is subjected to back and forth movement in a narrow path. However, in the sheet transfer apparatus relating to the aforementioned prior art, there has been no consideration regarding measures of recovering from the paper jam that occurs in the switchback path between the transfer belt and the discharge tray.

Measures to remove such paper jam include opening the switchback transfer path with one edge of a guide portion of the switchback transfer path as a pivot. However, enough opening angle is not available because a sheet supply tray or the like is disposed at an upper portion.

This type of sheet transfer apparatus is capable of handling sheet sizes up to A3 or B4. However, since the most commonly used sheet size is A4, it is possible to deal with the paper jam by opening a sheet transfer inlet of the switchback path, if the switchback path is designed to be capable of being opened.

For this reason, it is proposed that only a sheet transfer inlet of the switchback path corresponding to the A4 size is designed to be capable of being opened. However, since the larger size sheet such as A3 or B4 size uses far deeper areas of the switchback path, the entire switchback path is required to be opened to handle the paper jam.

An object of the present invention is to provide the sheet transfer apparatus that makes it extremely easy to handle the sheet jam at the sheet transfer inlet of the switchback path where the sheet jam occurs relatively easily, and even if the sheet jam occurs at a deeper area, an operator can handle the sheet jam easily.

Further objects and advantages of the invention will be apparent from the following description of the invention.

SUMMARY OF THE INVENTION

The first aspect of the present invention provides a sheet transfer apparatus including sheet supply means for drawing out a sheet on a sheet supply tray; transfer means for receiving the sheet from the sheet supply means and for placing it at a predetermined location on a platen of an image reading apparatus; discharge means for receiving the sheet after images thereon being read on the platen and for discharging it to a discharge tray arranged below the sheet supply tray; and a switchback path disposed inside the discharge tray for reversing the sheet as needed after reading images thereon. The switchback path is structured to have the first opening portion for opening a sheet inlet of the switchback path, which is a part of the discharge tray, and the second opening portion adjacent to the first opening portion.

Here, the first and second opening portions are connected to an apparatus frame such that they can rotate around shafts. One end of the second opening portion is connected to an apparatus frame such that the second opening portion can rotate around the shaft. The other end of the second opening portion hinged to the first opening portion. Furthermore, an opening angle of the first opening portion is configured to be larger than that of the second opening portion.

This configuration makes it easier to handle paper jam that occurs at the sheet inlet of the switchback path, and also makes it easier to handle the paper jam farther from the sheet inlet when necessary.

Further, in the sheet transfer apparatus, the first opening portion and the second opening portion are provided with opening locking means for controlling the opening operation so that the opening portions will not open inadvertently in a normal state.

The second aspect of the present invention provides a sheet transfer apparatus including sheet supply means for drawing out sheets on the sheet supply tray; transfer means for receiving the sheet from the sheet supply means and for placing it at a predetermined location on the platen of the image reading apparatus; discharge means for receiving the sheet after images thereon being read on the platen and for discharging it to the discharge tray arranged below the sheet supply tray; and the switchback path disposed inside the sheet supply tray for reversing the sheet as needed after reading images thereupon. The switchback path is structured to have a first opening portion for opening a sheet inlet of the switchback path, which is a part of the sheet supply tray, and a second opening portion adjacent to the first opening portion.

Here, in the first opening portion, an end portion of the switchback path is supported on a shaft such that the first opening portion can rotate around the shaft.

DETAILED DESCRIPTION OF PREFERRED EMBODIMENTS

Hereunder, preferred embodiments of the present invention will be explained with reference to the accompanied drawings. A sheet transfer apparatus 1 according to the present invention is mounted to a reading apparatus body via a hinge, and the like (not shown), to be capable of opening and closing a platen disposed on the upper portion of an image forming apparatus 8.

Figure 1:
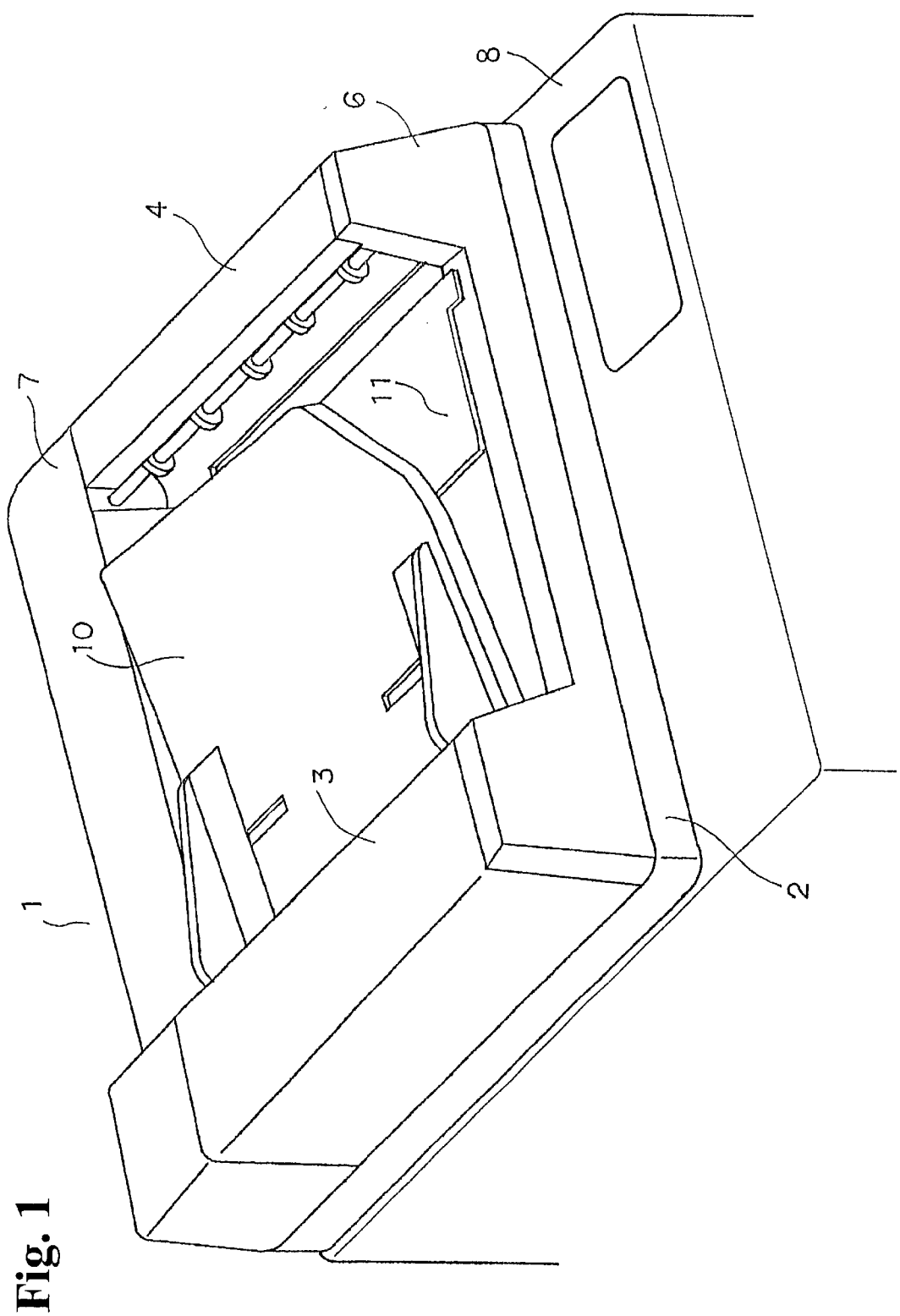
FIG. 1 is a top perspective view of a sheet transfer apparatus according to the present invention.
Figure 2:
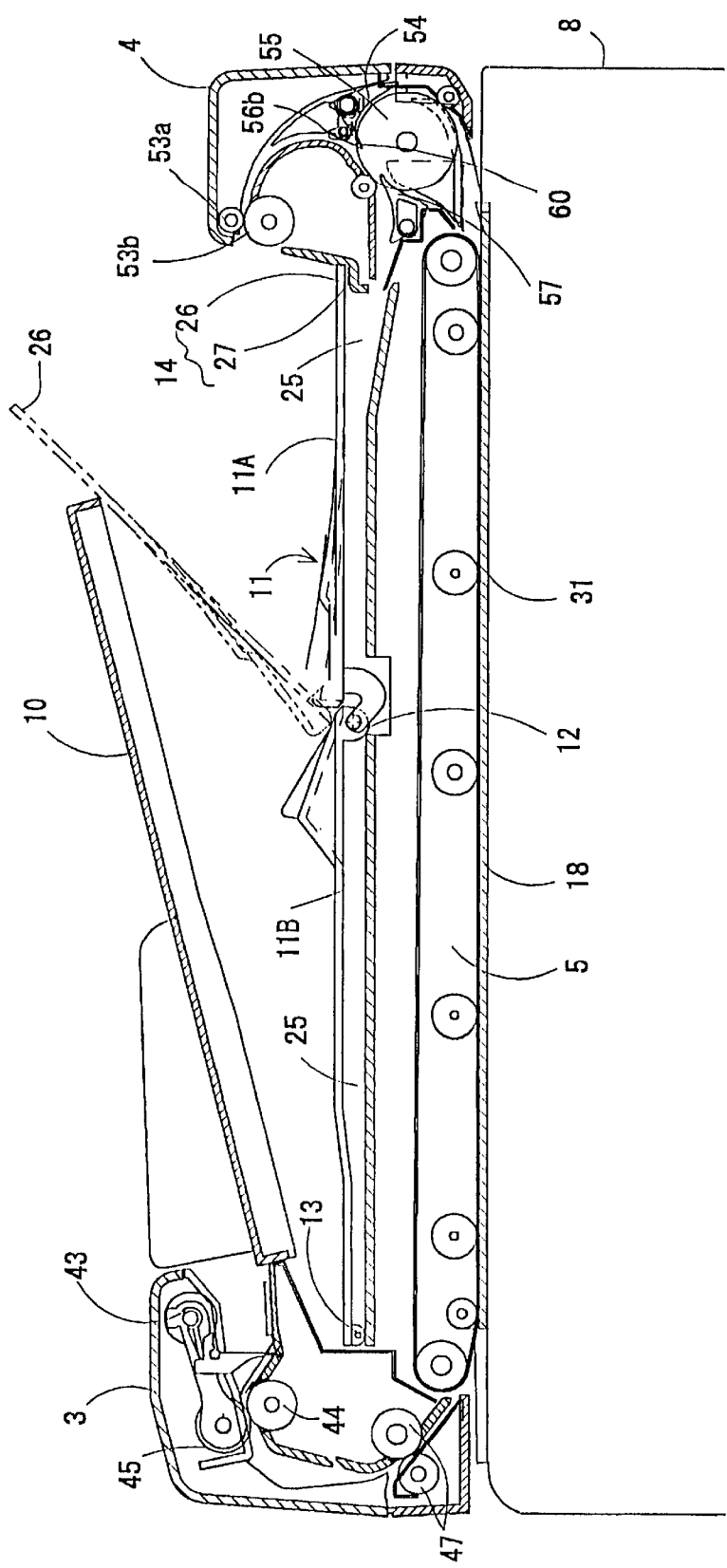
FIG. 2 is a view showing a cross section of a sheet transfer apparatus according to the present invention.

FIG. 1 is a top perspective view of the sheet transfer apparatus 1 according to the present invention. FIG. 2 is a sectional view of the sheet transfer apparatus seen from the front. In the sheet transfer apparatus according to this invention, sheet supply means, transfer means and discharge means are configured as units.

On the sheet transfer apparatus 1, as shown in FIG. 1 and FIG. 2, there are formed a support frame 2; a sheet supply tray 10; a sheet supply unit 3 disposed on one end of the support frame 2 for drawing sheets stacked on the sheet supply tray 10; a transfer unit 5 for receiving the sheets drawn from the sheet supply unit 3 and for transferring them to a predetermined position on a platen of an image reading apparatus (not shown in the drawings) located below the sheet supply unit 3; discharge means 4 disposed on the other end of the support frame 2 for discharging the sheets after reading images; and a discharge tray 11 for stacking the discharged sheets. A switchback path 25 for reversing the sheet after reading images is situated under the discharge tray. Also, a front cover 6 and a rear cover 7 are disposed to protect a main body of the apparatus. The sheet supply unit 3, the transfer unit 5, and the discharge unit 4 are mounted to predetermined mounting locations on the support frame 2.

The sheet supply unit 3, the discharge unit 4 and the transfer unit 5 are provided with a sheet supply motor, a discharge motor, and a transfer motor (not shown), which are capable of rotating in forward and reverse directions, to drive rollers of each unit, respectively.

The sheet is stacked with a surface with images upward on the sheet supply tray 10, as shown in FIG. 2. The sheet supply unit 3 draws the stacked sheet. After the sheet is reversed approximately 180 degrees, the sheet stops at a predetermined reading position under a transfer belt 18 of the transfer means 5 with facing downward. After the sheet is read, the sheet is discharged on the discharge tray 11 by the discharge unit 4.

However, when the sheets stacked on the sheet supply tray 10 are a set of a plurality of sheets, a page order of the set is reversed if using the above sheet discharging method because the sheets are drawn out and read continuously from the upper most sheet. To prevent this, the discharge unit does not discharge the sheets after reading to the discharge tray as they are, but first the discharge unit transfers the sheet into the switchback path 25 situated on a backside (an inner-side) of the discharge tray 11, then discharges the sheet on the discharge tray 11 from the trailing edge thereby maintaining the original page order of the set.

Note that, operations of supply, transfer, switchback and discharge of the sheets in the sheet transfer apparatus according to the present invention are described below, including an operation for reading both sides of the sheets.

When the sheets are transferred into the switchback path 25, sheet jam (paper jam) can easily occur since the sheets are bent by the discharge means before the transfer inlet and there are forward and subsequent backward movements of the sheets inside the switchback path. For that reason, the switchback path must be structured to be capable of opening so that any operators can easily remove the jammed paper.

FIG. 2 illustrates the first embodiment of the sheet transfer apparatus according to the present invention. According to the first embodiment, the sheet supply tray 10 is mounted on an upper portion of the apparatus, and the sheet supply unit 3 disposed at a left side supplies the sheets to the transfer unit 5 sequentially from the uppermost sheet stacked on the sheet supply tray 10. The discharge tray 11 is disposed below the sheet supply tray 10. As described above, after reading the images, the sheet must be reversed as needed. For this purpose, the switchback path 25 is established inside the discharge tray.

The discharge tray 11 is divided into two main portions. The first main portion is a first opening portion 11A that opens a sheet inlet of the switchback path. The second main portion is a second opening portion 11B adjacent to the first opening portion 11A. The discharge tray 11 is structured to be opened by using the first opening portion 11A and the second opening portion 11B. This structure enables the switchback path 25 to be opened to remove the jammed sheet.

Figure 3:
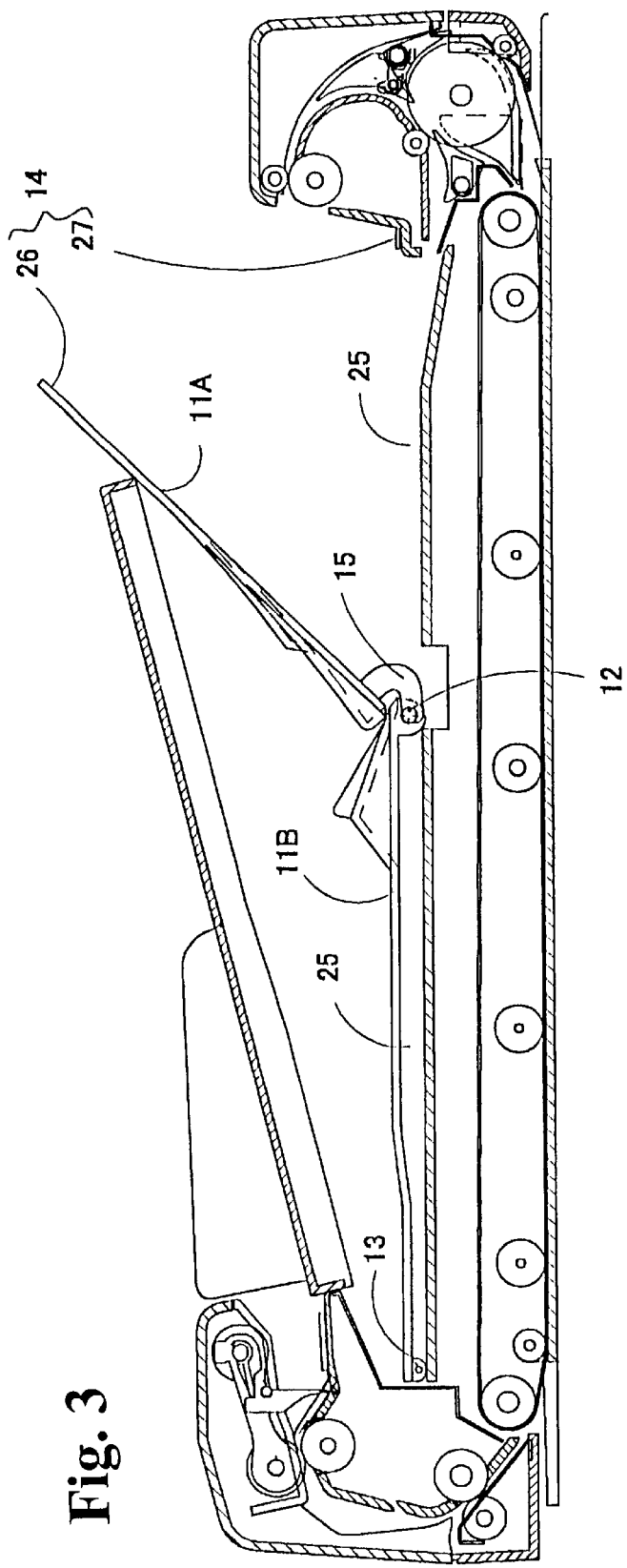
FIG. 3 is a view showing a state where only the first opening portion opens.

FIG. 3 shows a state in which only the first opening portion 11A opens. The first opening portion is hinged to the second opening portion in a way that the first opening portion can rotate around a shaft 12. The second opening portion is hinged to the apparatus frame such that the second opening portion can rotate around a shaft 13.

As shown in FIG. 3, a rotating angle of the first opening portion 11A is approximately 45 degrees according to this embodiment. This angle provides enough space to remove any jammed sheet. If it is opened any further, it will reach an angle where it will hit the upper sheet supply tray 10. An opening angle of the second opening portion 11B is approximately 25 degree. Normally, the approximately 25 degree opening angle is enough because the paper jams mainly occurs in the first opening portion 11A and the first opening portion 11A can open wider. This configuration makes it easier to handle the paper jam at the sheet inlet of the switchback path, and it is also possible to handle the paper jam at farther from the sheet inlet.

A sheet magnet is attached to a top of a free opening portion of the first opening portion 11A. Also, a steel piece 27 is disposed on a portion corresponding thereto at the apparatus frame. The magnet portion 26 and the steel piece 27 magnetically attract each other. They form opening lock means 14 of the first opening portion 11A and the second opening portion 11B. This opening lock means 14 prevents the problems such that the first opening portion 11A and the second opening portion 11B open inadvertently when the sheet transfer apparatus 1 closes or opens the platen. Therefore, only when an operator tries to open, the first opening portion 11A and the second opening portion 11B open. While the magnet system is employed to control the opening operation of the switchback path, any other means instead of the magnet, such a latch or a VELCRO tape, or a detachable tape, having substantially the same effect is equally acceptable.

One end of the second opening portion 11B is attached to the apparatus frame such that the second opening portion 11B can rotate around the shaft 13, and the other end of the second opening portion 11B is connected to the first opening portion 11A with a hinge 15. With this structure, the operator can open the second opening portion 11B simultaneously by lifting the first opening portion 11A upward, thus making it easier to remove larger size sheets extending to a bottom of the second opening portion 11B. Note that the support shaft 12 and the hinge 15 are mounted on ends of the opening portions 11A and 11B (edges thereof in a direction perpendicular to the direction of sheet transfer). Thus, the support shaft 12 and the hinge 15 are not located in a position where they interfere with the sheet entering the switchback path 25.

Figure 4:
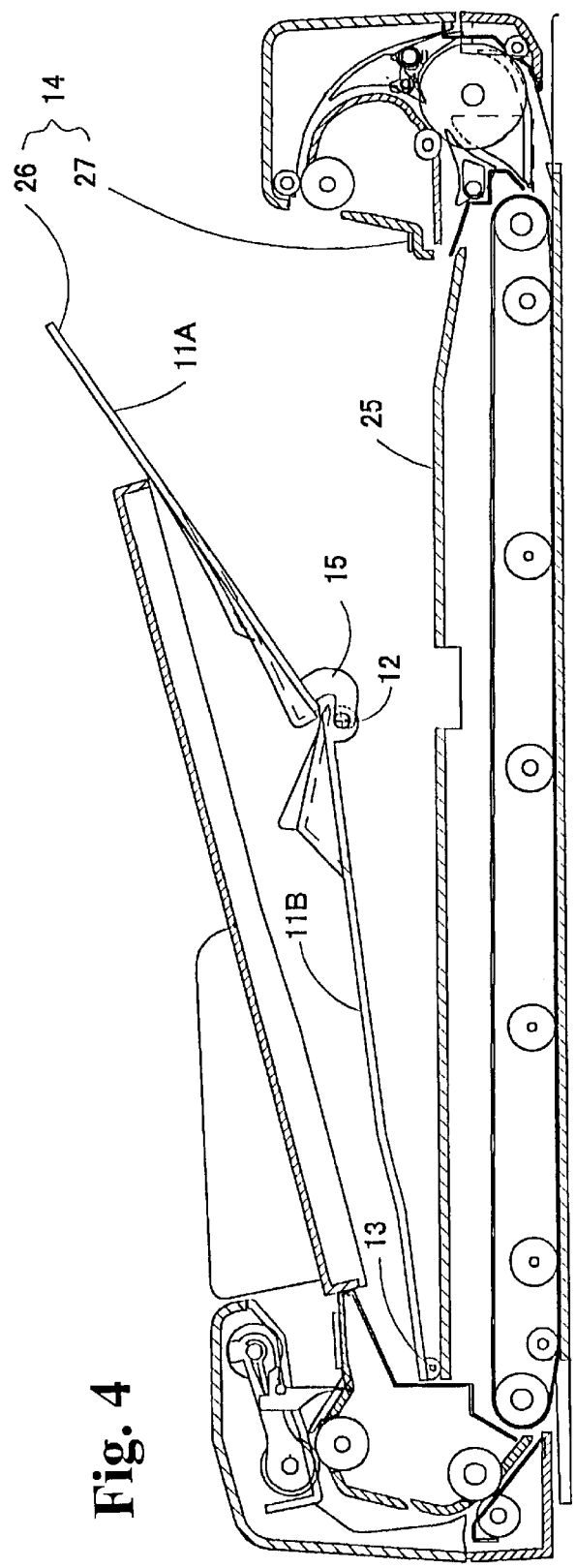
FIG. 4 is a view showing a state where the second opening portion opens accompanied by the first opening portion to which the second opening portion is connected by a hinge.

In FIG. 4, the entire switchback path 25 is opened by lifting the first opening portion 11A, which accompanies the lifting of the second opening portion 11B. In this state, an operator can easily remove the jammed sheets even if they are deep in the switchback path. Furthermore, because the second opening portion 11B is pulled simultaneously by lifting the first opening portion 11A due to the hinge, the operator is able to easily lift these opening portions with one hand, and remove the jammed sheet with the other hand.

Figure 5:
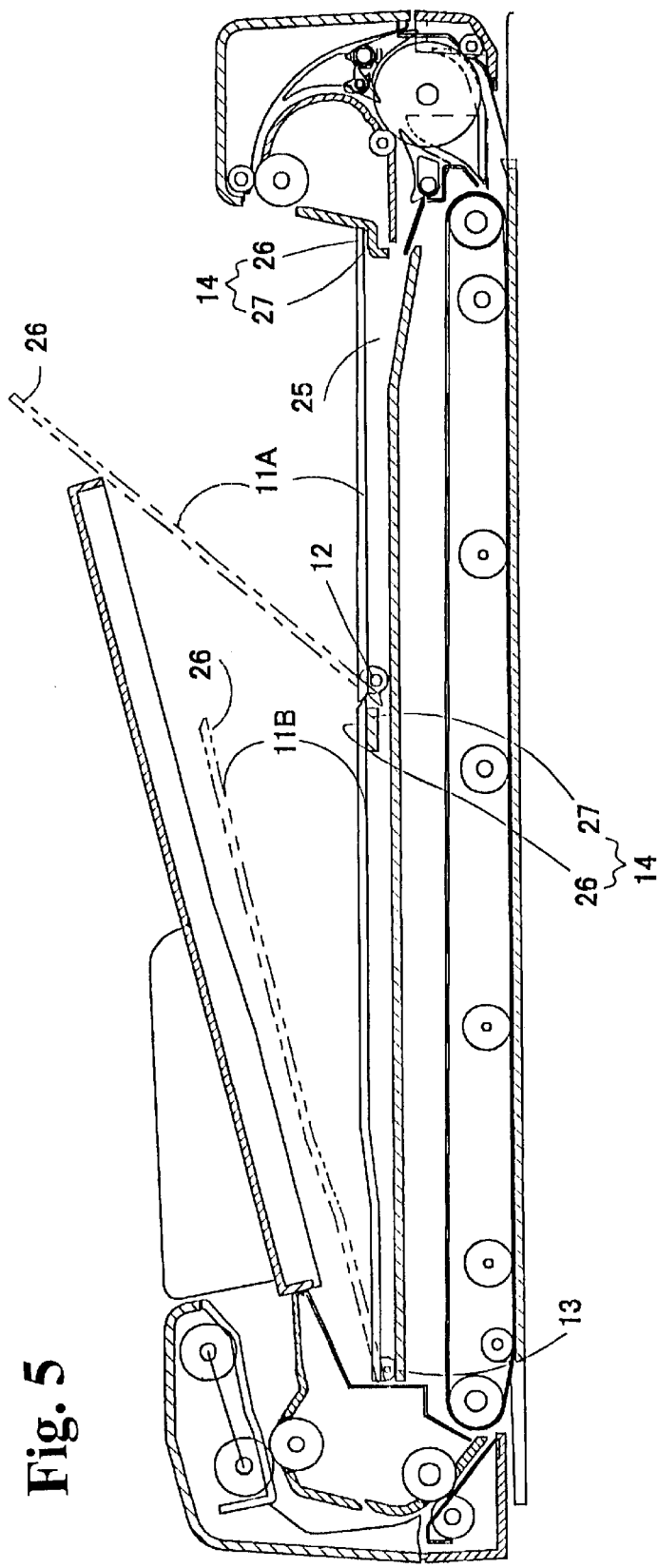
FIG. 5 is a view showing a modification of the present invention.

FIG. 5 is a view showing a modification of the first embodiment of the present invention. In this modification of the first embodiment, the first opening portion 11A can rotate around the support shaft 12 on the apparatus frame, and the second opening portion 11B can also rotate around the support shaft 13 on the apparatus frame. These two opening portions are not mutually interlocked, but such a structure allows easy retrieval and removal of jammed sheets.

Figure 6:
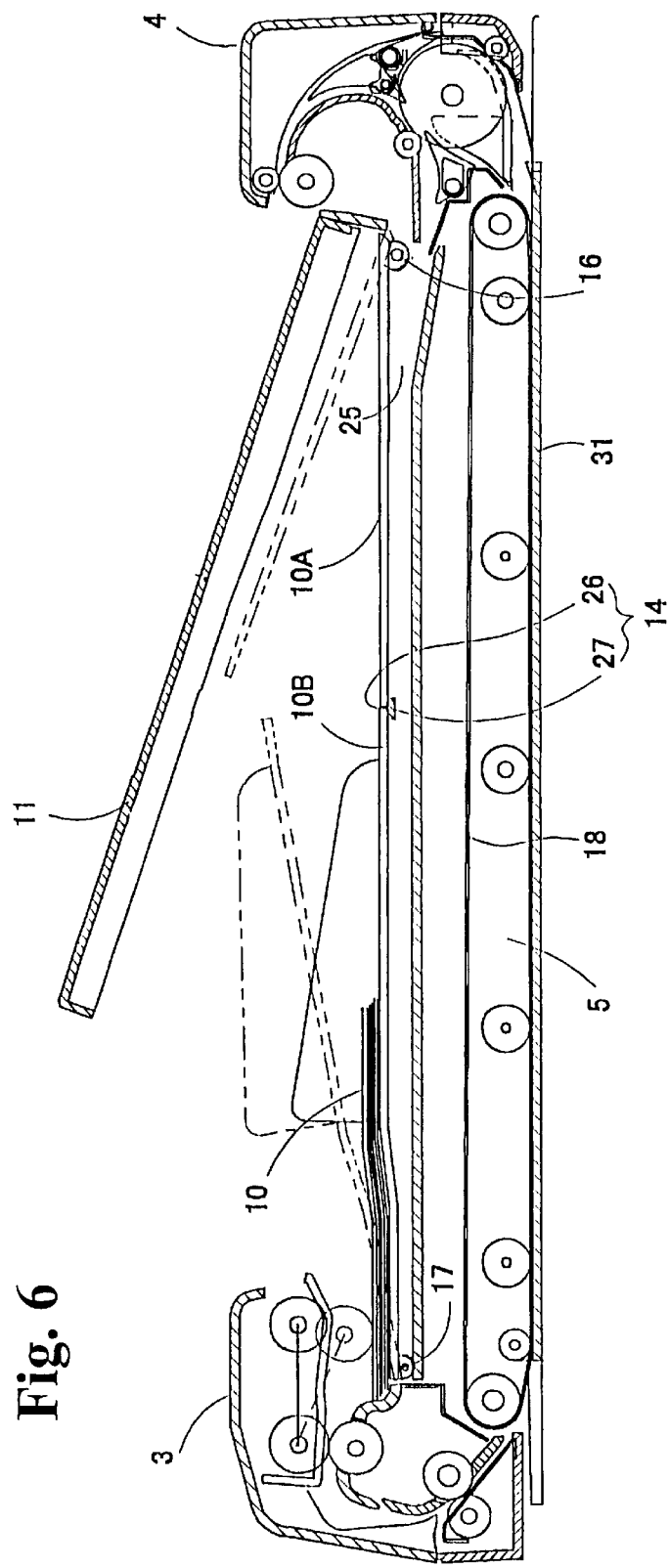
FIG. 6 is a plan view showing a cross section of another embodiment of the present invention.

FIG. 6 is showing an example of the second embodiment of the present invention. In this example, the discharge tray 11 for stacking the sheets from the discharge unit 4 is arranged above the sheet supply tray 10 from which the sheets are transferred to the sheet supply unit 3 on the left side. The switchback path 25 is formed at a backside (or an inner side) of the sheet supply tray 10.

For this reason, the switchback path 25 according to this example can be opened by rotating the sheet supply tray 10. The sheet supply tray 10 is composed of the first opening portion 10A that opens the sheet inlet of the switchback path 25, and the second opening portion 10B adjacent to the first opening portion 10A.

The first opening portion 10A is situated at a sheet inlet side of the switchback path such that the first opening portion 10A can rotate around a support shaft 16. The second opening portion is supported on a support shaft 17 at an opposite end side to the sheet inlet of the switchback path such that the second opening portion can rotate around the support shaft. This configuration allows the switchback path 25 formed inside the sheet supply tray 10 to be opened, and makes it easy to retrieve and remove the jammed sheet.

The following describes general operations of the sheet transfer apparatus described above. First, a single side reading mode of the image reading apparatus will be explained with reference to FIGS. 7(a)–7(j).

Figure 7A:
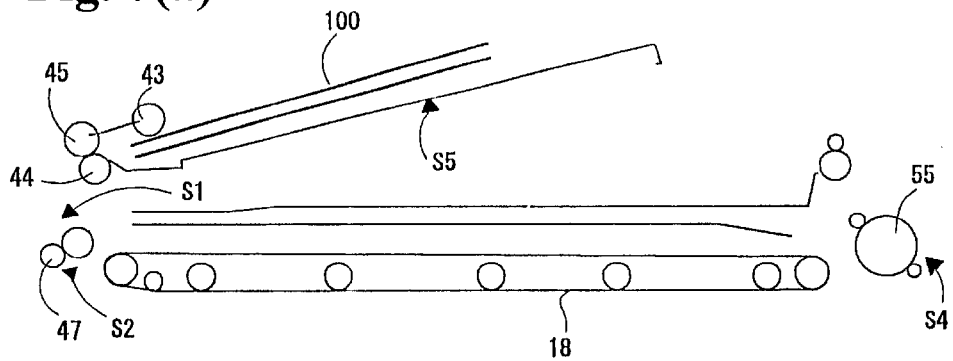
FIGS. 7(a)–7(j) are views showing operations of reading images on one side of a sheet in the sheet transfer apparatus according to the present invention.
Figure 7B:
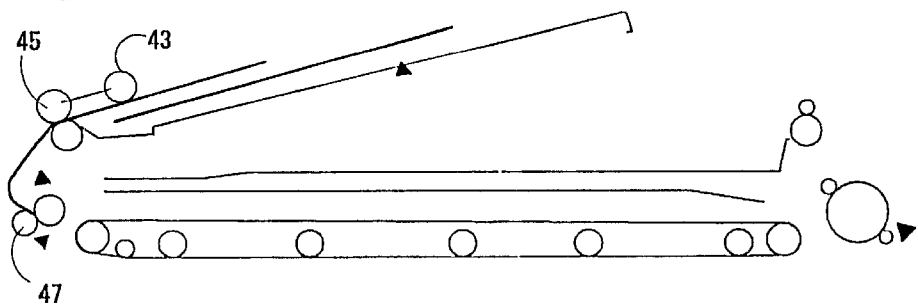
Figure 7C:
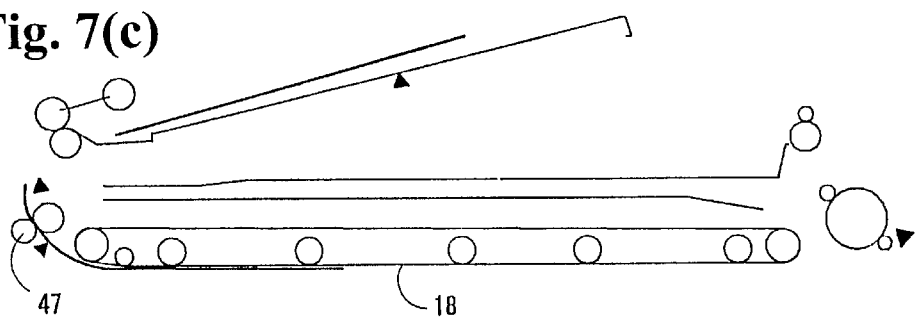
Figure 7D:
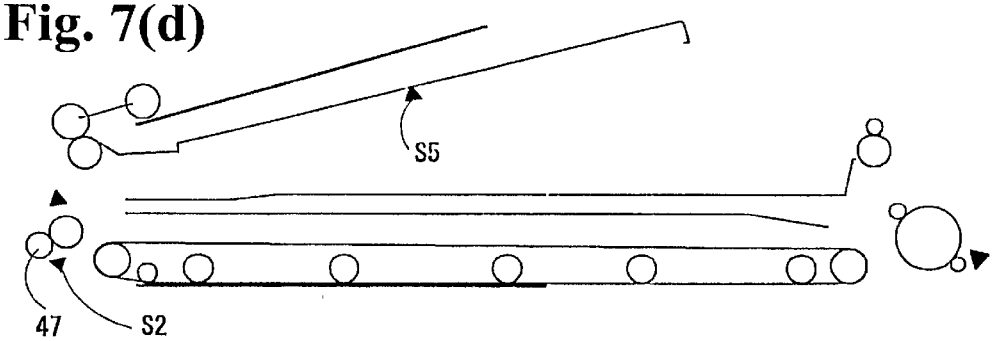
Figure 7E:
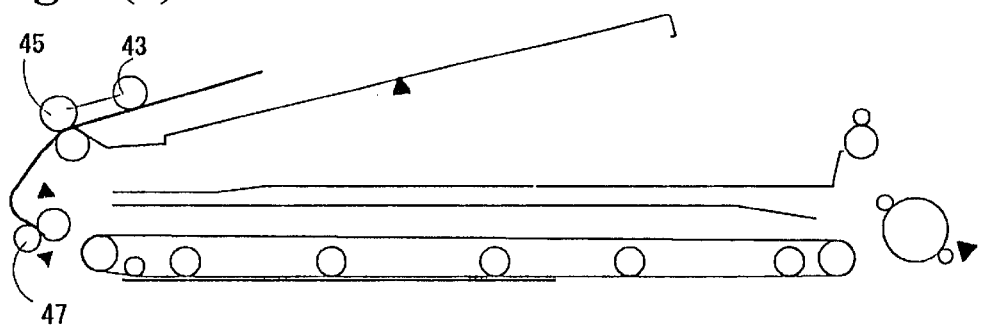
Figure 7F:
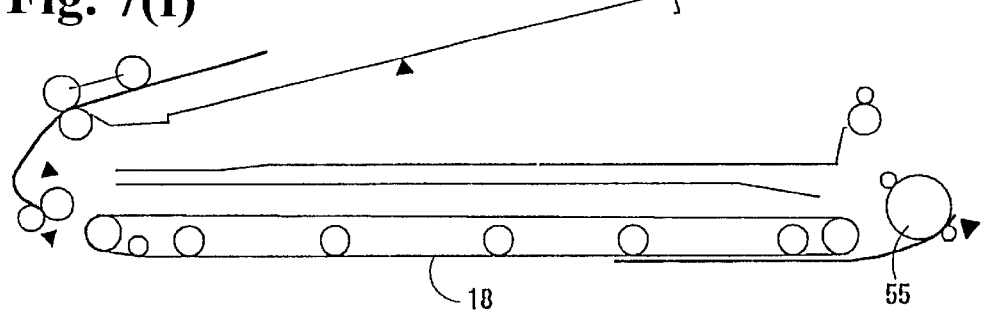

Sheets 100 are placed on a sheet supply tray 10 (FIG. 7(a)). When an empty sensor S5 detects the sheets 100, a sheet supply motor rotates forward to drive a draw-out roller 43 and a sheet supply roller 45. The sheets 100 are drawn out by the draw-out roller 43 and separated into a single sheet by the sheet supply roller 45 and a separating member 44 so that the single sheet can be supplied. After a register sensor S1 detects a leading edge of the single sheet 100, the sheet supply motor drives by a predetermined amount thereby driving the leading edge of the sheet 100 to a nip of a register roller 47 to correct skew of the sheet, then the sheet supply motor stops (FIG. 7 (b)). Then, a sheet supply motor is driven in reverse and the register roller 47 is driven to supply the sheet toward a platen 31. At the same time, a transfer motor is rotated forward to rotate the transfer belt 18 for transferring the sheet 100 fed from the register roller 47 along a platen 31 (FIG. 7(c)). After a timing sensor S2 detects a trailing edge of the single sheet 100, the sheet is transferred by a predetermined distance, and then the transfer motor stops to stop the register roller 47 and the transfer belt 18. The sheet 100 is placed at a predetermined position on an upper surface of the platen 31 where the reading means reads the sheet 100 (FIG. 7 (d)).

At this point, while the first sheet 100 is being read, if the empty sensor S5 detects a second sheet 101, or if the second sheet 101 is set on the sheet supply tray 10, the sheet supply motor rotates forward to drive the draw-out roller 43 and the sheet supply roller 45 to draw out the second sheet 101 in the same way as the first sheet 100. Then, the second sheet is separated into a single sheet, and after a leading edge of the second sheet abuts against the nip of the register roller 47, the second sheet stops and stays there (FIG. 7 (e)).

Upon completion of the reading of the first sheet, the transfer motor again rotates forward, and at the same time, a discharge motor also rotates forward. The transfer belt 18 and the inversion roller 55 are driven forward for transferring the first sheet 100 out from the top of the platen 31 (FIG. 7(f)).

Here, when a reverse/discharge sensor S4 detects the leading edge of the first sheet 100, the sheet supply motor rotates in reverse to drive the resist roller 47. The second sheet 101, which stays at the nipping point of the register roller 47, is transferred toward the platen 31. In the same way as the case of the first sheet 100, the sheet is transferred to the predetermined position on the platen 31 and stops thereat.

Figure 7G:
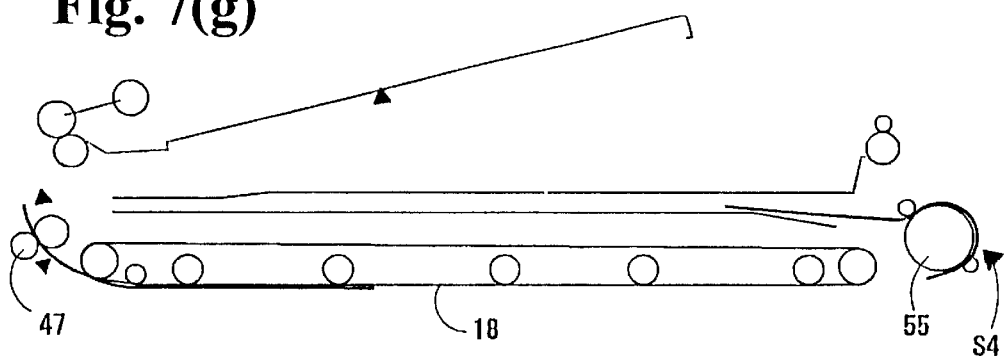
Figure 7H:
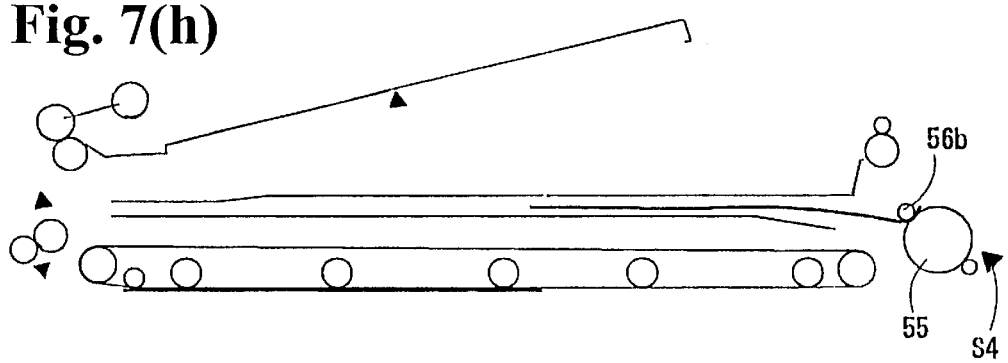
Figure 7I:
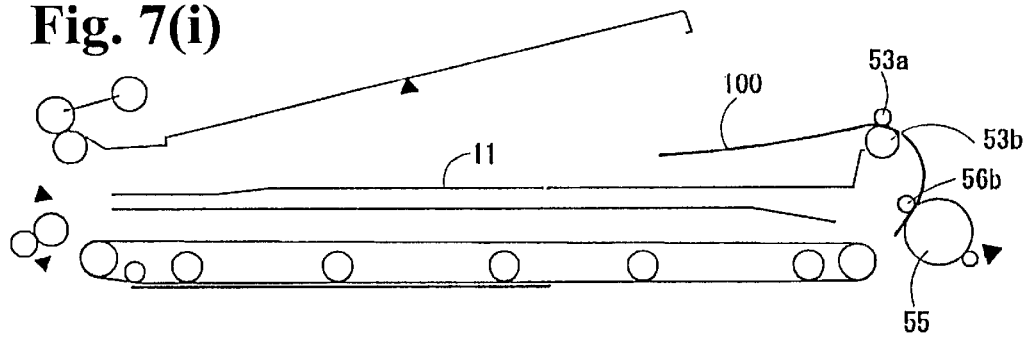
Figure 7J:
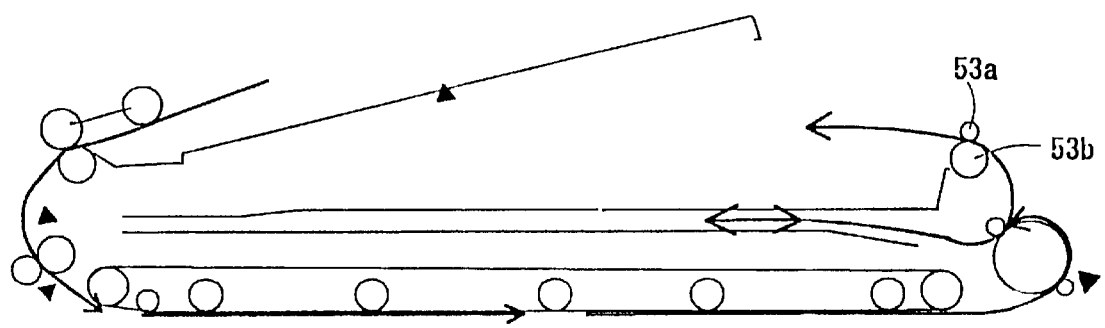

The first sheet 100 discharged from the top of the platen 31 is guided to the switchback path 25 (FIG. 7(g)) by a discharge flapper 54 and an reverse flapper 57. The sheet 100 is transferred by a predetermined distance after the reverse/discharge sensor S4 detects a trailing edge thereof. Then, the discharge motor stops to stop a reverse roller 55 temporarily. At this time, at a position passing a free-falling flapper 60, the trailing edge of the sheet 100 is nipped by the reverse roller 55 and a pinch roller 56b and stopped (FIG. 7 (h)). Then, the discharge roller M2 rotates in reverse to switch back the sheet 100 nipped and stopped by the reverse roller 55 and the pinch roller 56b. The sheet is discharged to the discharge tray 11 by a pair of discharge rollers 53a and 53b (FIG. 7(i)).

The same procedure for discharging the first sheet 100 is performed to discharge the second sheet 101. Similarly, the same process for feeding and discharging is repeated for the other sheets that remain on the sheet supply tray 10 (FIG. 7(j)).

(Note that there is a free-falling flapper 60 hanging downward by own weight and being configured to rotate upward when pushed by the leading edge of the sheet as it passes therethrough. Also, the discharge roller 53b has a drive mechanism to rotate only in one direction, regardless of forward or reverse rotation of the discharge motor.

An operation of reading both sides of a sheet in this sheet transfer apparatus will be explained with reference to FIGS. 8(a)–8(h). The sheet supply and transfer are the same operation as that of the single side reading mode from supplying the first sheet 100 to reading the top surface thereof. (FIGS. 7(a)–7(e))

Figure 8A:
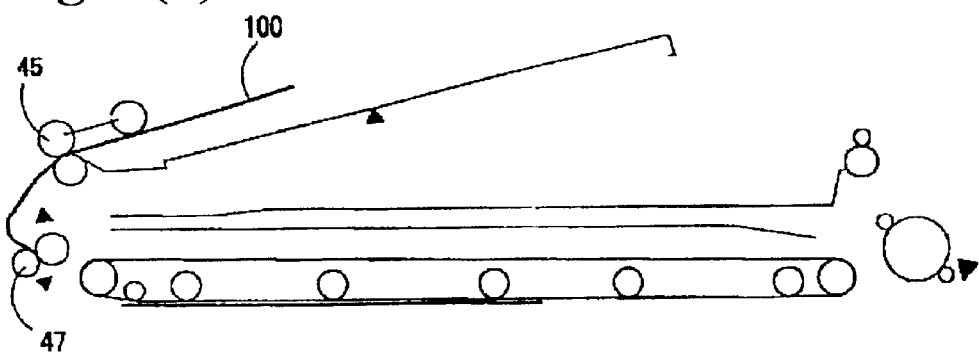
FIGS. 8(a)–8(h) are views showing operations of reading images on both sides of a sheet in the sheet transfer apparatus according to the present invention.
Figure 8B:
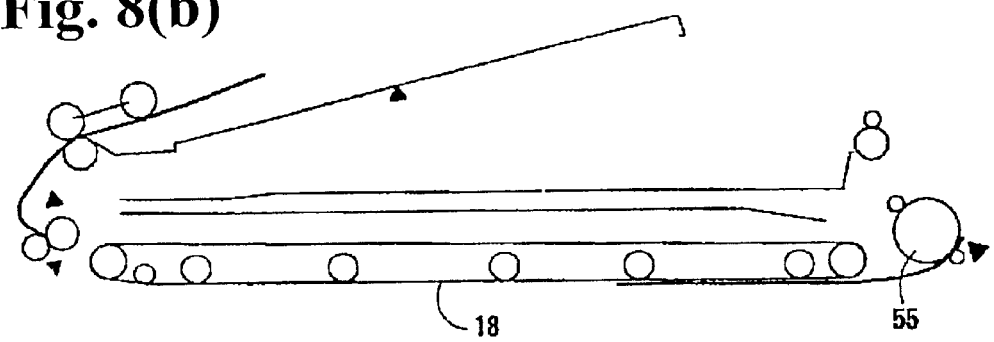
Figure 8C:
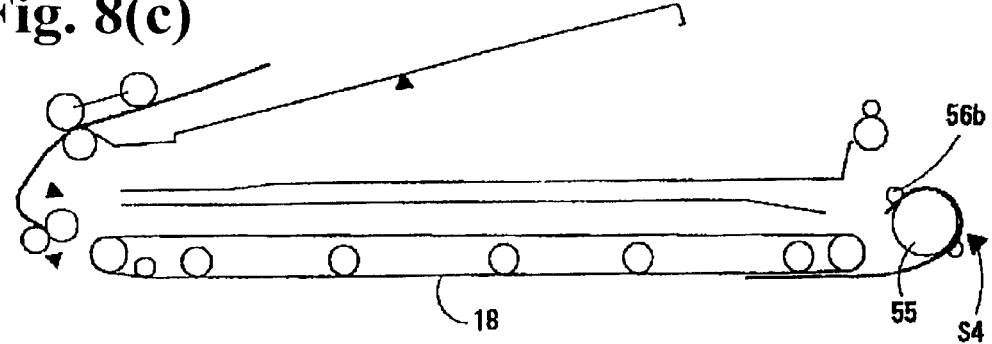
Figure 8D:
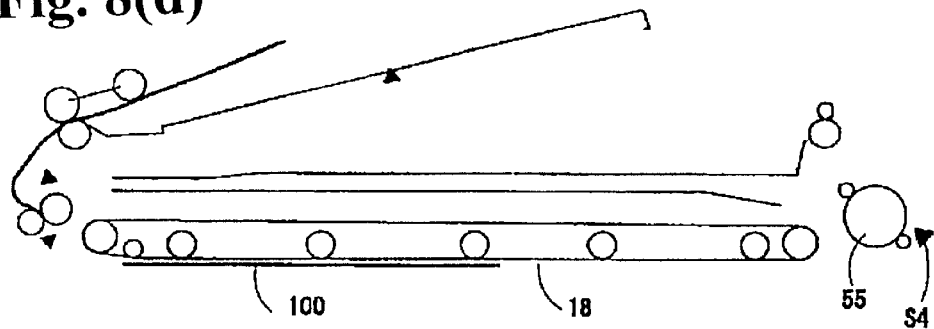
Figure 8E:
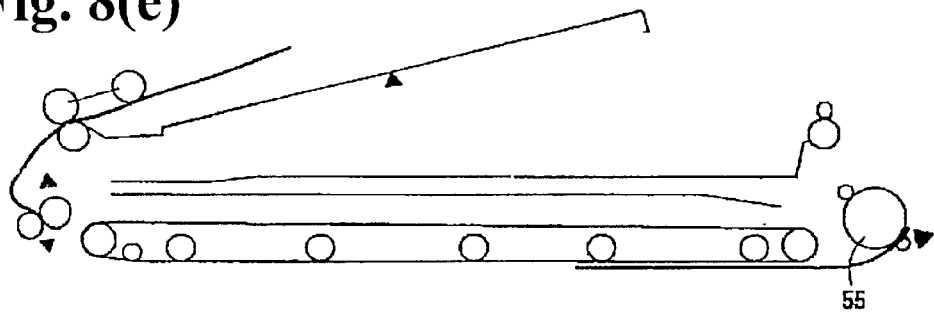
Figure 8F:
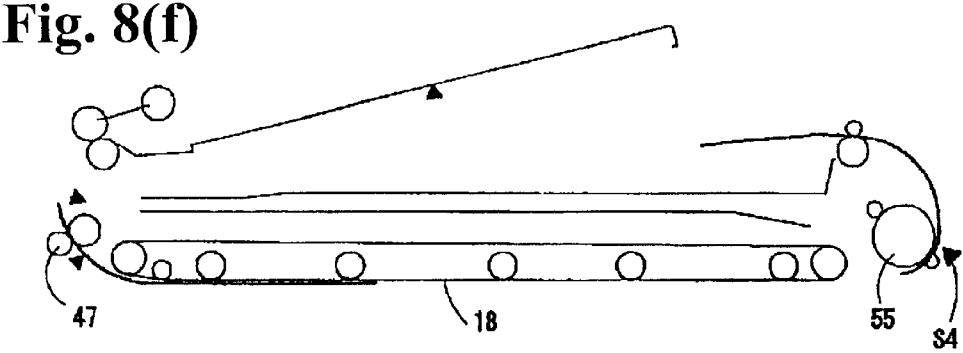
Figure 8G:
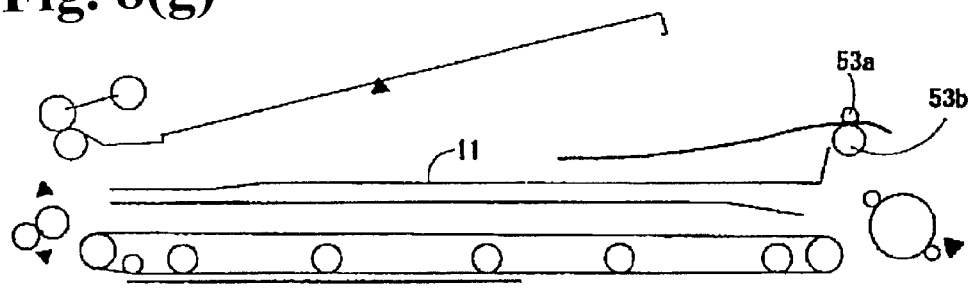
Figure 8H:
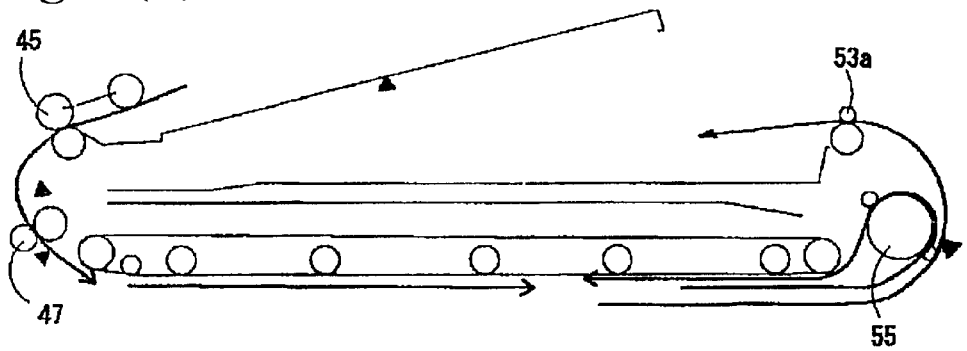

In a state shown in FIG. 8(a), after reading its front side, the first sheet 100 is discharged from the top of the platen 31 (FIG. 8(b)) by the transfer belt 18 and the reverse roller 55 through the forward drive of the transfer motor and the discharge motor.

After the reverse sensor S4 detects the leading edge of the sheet 100 discharged from the platen 31, the sheet 100 is transferred by a predetermined distance to pass through the discharge flapper 54 and the free-falling flapper 60. The sheet stops at a position where the leading edge of the sheet is nipped by the reverse roller 55 and the pinch roller 56b, and the transfer motor and the discharge motor stop (FIG. 8(c)). The transfer motor rotates in reverse at the same time when the reverse flapper 57 switches in a direction to guide the sheet 100 to the platen 31 again, and the discharge motor again rotates in forward. Through these steps, the sheet 100 is reversed and fed to the platen 31 again, and is transferred to a predetermined position on the platen 31 (FIG. 8(d)).

The backside of the sheet 100 transferred to a predetermined position on the platen 31 is read by the reading means. When the reading is completed, the transfer motor drives forward and the discharge motor rotates forward at the same time. This makes the transfer belt 18 move forward and the reverse roller 55 rotate forward for transferring the first sheet 100 out from the top of the platen 31 (FIG. 8(e)).

Here, when the reverse sensor S4 detects the leading edge of the first sheet 100, the sheet supply motor rotates in reverse to drive the register roller 47. The second sheet 101, which is nipped and stays at the nipping point of the register roller 47, is controlled to be sent toward the platen 31. In the same way as for the first sheet 100, the sheet is transferred to a predetermined position on the platen 31 and stopped there.

When the reverse sensor S4 detects the leading edge of the first sheet 100 discharged from the top of the platen 31, the discharge flapper 54 switches to a position to guide the sheet 100 directly into a pair of the discharge rollers 53. This allows a pair of the discharge rollers 53a and 53b to discharge the first sheet 100 to the discharge tray 11 (FIGS. 8(f)–8(g)).

After that, the same procedure for discharging the first sheet 100 is performed to discharge the second sheet 101. Similarly, the same processes of feeding and discharging are repeated for other sheets that remain on the sheet supply tray (FIG. 8(h)).

As described above, in the present invention, the switchback path can be easily opened by lifting the first and the second opening portions, each of which is structured to enable rotational movement around the shaft on the apparatus frame. It is possible to retrieve and remove the sheet jammed at the inlet of the switchback path or deeper inside, resulting in superior operability and improved maintainability of the sheet transfer apparatus.

While the invention has been explained with reference to the specific embodiment of the invention, the explanation is illustrative and the invention is limited only by the appended claims.

What is claimed is:

1. A sheet transfer apparatus for an image reading apparatus having a platen and a frame to read an image on a sheet, comprising:
   a sheet supply tray for storing the sheet;
   sheet supply means disposed adjacent to the sheet supply tray for drawing out the sheet on the sheet supply tray;
   transfer means disposed adjacent to the sheet supply means for receiving the sheet from the sheet supply means and placing the sheet at a predetermined position on the platen of the image reading apparatus for reading the image thereon;
   discharge means disposed adjacent to the platen for discharging the sheet on the platen after reading the image thereon;
   a discharge tray arranged adjacent to the discharge means for receiving the sheet discharged by the discharge means; and
   switchback means disposed above the platen for reversing the sheet when necessary, and including a switchback path having an inlet side for receiving the sheet to reverse the same, a first opening portion for opening a first area near the inlet side, and a second opening portion for opening a second area away from the inlet side of the switchback path, said switchback path being located below the discharge tray.

2. A sheet transfer apparatus according to claim 1, wherein said first and second opening portions are formed separately, and are adapted to be connected to the frame so that each of the first and second opening portions can rotate and open the switchback path.

3. A sheet transfer apparatus according to claim 1, wherein said first opening portion has an opening angle opening in an angle larger than that of the second opening portion.

4. A sheet transfer apparatus according to claim 1, wherein said second opening portion has one end to be connected to the frame for rotatably opening, and the other end hinged to the first opening portion.

5. A sheet transfer apparatus according to claim 4, wherein said first opening portion has an opening angle opening in an angle larger than that of the second opening portion.

6. A sheet transfer apparatus according to claim 2, further comprising opening locking means attached to the first and second opening portions for preventing the first and second opening portions from inadvertently opening.

7. A sheet transfer apparatus according to claim 4, further comprising opening locking means attached to the first opening portion for preventing the first opening portion from inadvertently opening.

8. A sheet transfer apparatus according to claim 1, wherein said first and second opening portions constitute the discharge tray.

9. An image reading apparatus comprising: the sheet transfer apparatus according to claim 1, and an image reading device for reading the image on the sheet transferred by the sheet transfer apparatus.

10. A sheet transfer apparatus for an image reading apparatus having a platen and a frame to read an image on a sheet, comprising:
    a sheet supply tray for storing the sheet;
    sheet supply means disposed adjacent to the sheet supply tray for drawing out the sheet on the sheet supply tray;
    transfer means disposed adjacent to the sheet supply means for receiving the sheet from the sheet supply means and placing the sheet at a predetermined position on the platen of the image reading apparatus for reading the image thereon;

discharge means disposed adjacent to the platen for discharging the sheet on the platen after reading the image thereon;

a discharge tray located above the sheet supply tray and arranged adjacent to the discharge means for receiving the sheet discharged by the discharge means; and switchback means disposed above the platen for reversing the sheet when necessary, and including a switchback path having an inlet side for receiving the sheet to reverse the same, a first opening portion for opening a first area near the inlet side, and a second opening portion for opening a second area away from the inlet side of the switchback path, said switchback path being located below the sheet supply tray separately from a space above the sheet supply tray.

11. A sheet transfer apparatus according to claim 10, wherein said first opening portion is rotationally connected at the sheet inlet of the switchback path so that the first opening portion can rotate and open in one direction.

12. A sheet transfer apparatus according to claim 11, wherein said second opening portion is connected at a side opposite to the sheet inlet of the switchback path so that the second opening portion can rotate and open in a direction opposite to said one direction.

13. An image reading apparatus comprising: the sheet transfer apparatus according to claim 10, and an image reading device for reading the image on the sheet transferred by the sheet transfer apparatus.

14. A sheet transfer apparatus according to claim 10, wherein said second opening portion supports the sheet as the sheet supply tray.

* * * * *